United States Patent [19]

Lee

[11] Patent Number: 5,793,434

[45] Date of Patent: Aug. 11, 1998

[54] ASPECT RATIO CONVERTER AND METHOD THEREOF

[75] Inventor: Hyo-Seung Lee, Seoul, Rep. of Korea

[73] Assignee: Samsung Electronics Co., Ltd., Kyungki-do, Rep. of Korea

[21] Appl. No.: 719,623

[22] Filed: Sep. 25, 1996

[30] Foreign Application Priority Data

Apr. 29, 1996 [KR] Rep. of Korea ............... 1996/13480

[51] Int. Cl.$^6$ ............................................... H04N 7/01
[52] U.S. Cl. ............................................... 348/445
[58] Field of Search ............................ 348/445, 441, 348/556, 714, 581, 501, 516

[56] References Cited

U.S. PATENT DOCUMENTS

| | | | |
|---|---|---|---|
| 5,331,346 | 7/1994 | Shields et al. | 348/445 |
| 5,459,521 | 10/1995 | Usami | 348/445 |
| 5,677,737 | 10/1997 | den Hollander | 348/445 |
| 5,677,738 | 10/1997 | Mizutani et al. | 348/445 |

Primary Examiner—Victor R. Kostak
Attorney, Agent, or Firm—Sughrue, Mion, Zinn, Macpeak & Seas, PLLC

[57] ABSTRACT

In an aspect ratio converting apparatus and method, the apparatus includes a controller and a memory generates the controller write and read enabling signals, a write clock signal of a first frequency and a read clock signal of a second frequency different from the first frequency. The memory is used for writing video data synchronized with the first frequency in response to the write enabling signal and reading the written video data synchronized with the second frequency in response to the read enabling signal. The memory has at least the capacity of storing pixel data corresponding to the difference between the first frequency and the second frequency. The power consumption of an aspect ratio converter is reduced by converting an aspect ratio using a FIFO memory. A miniaturized device and high-speed performance can be attained. Further, the number of control signals necessary for reading and writing data from/in the memory is reduced. Also, the delay time of an input signal is reduced to less than one line.

8 Claims, 4 Drawing Sheets

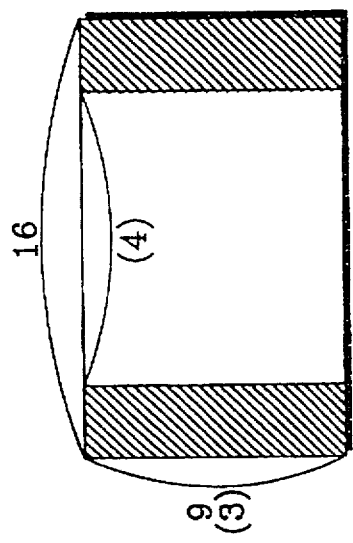
Fig_1
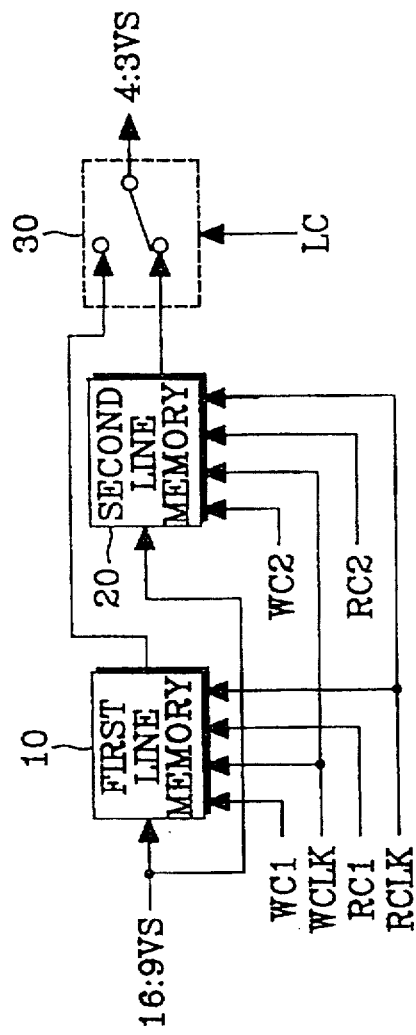
Fig_2

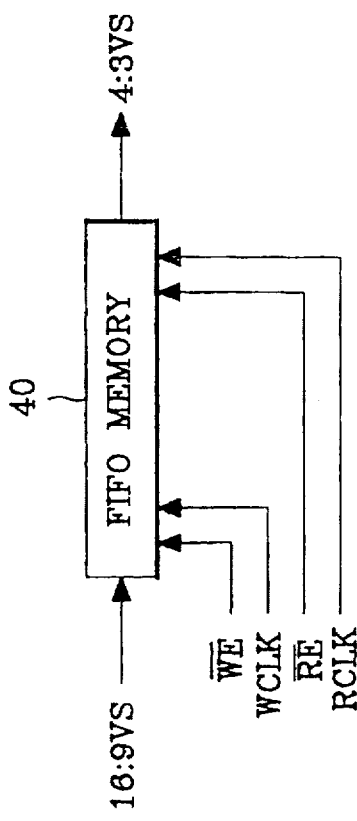
Fig_4
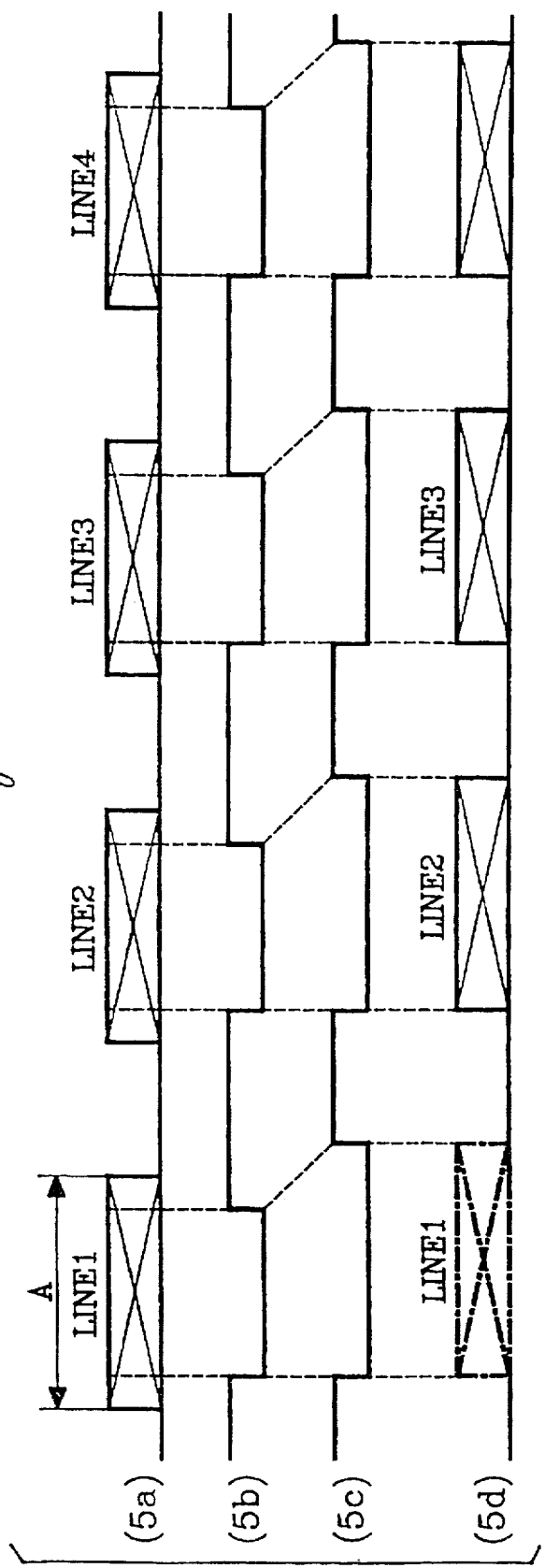
Fig_5

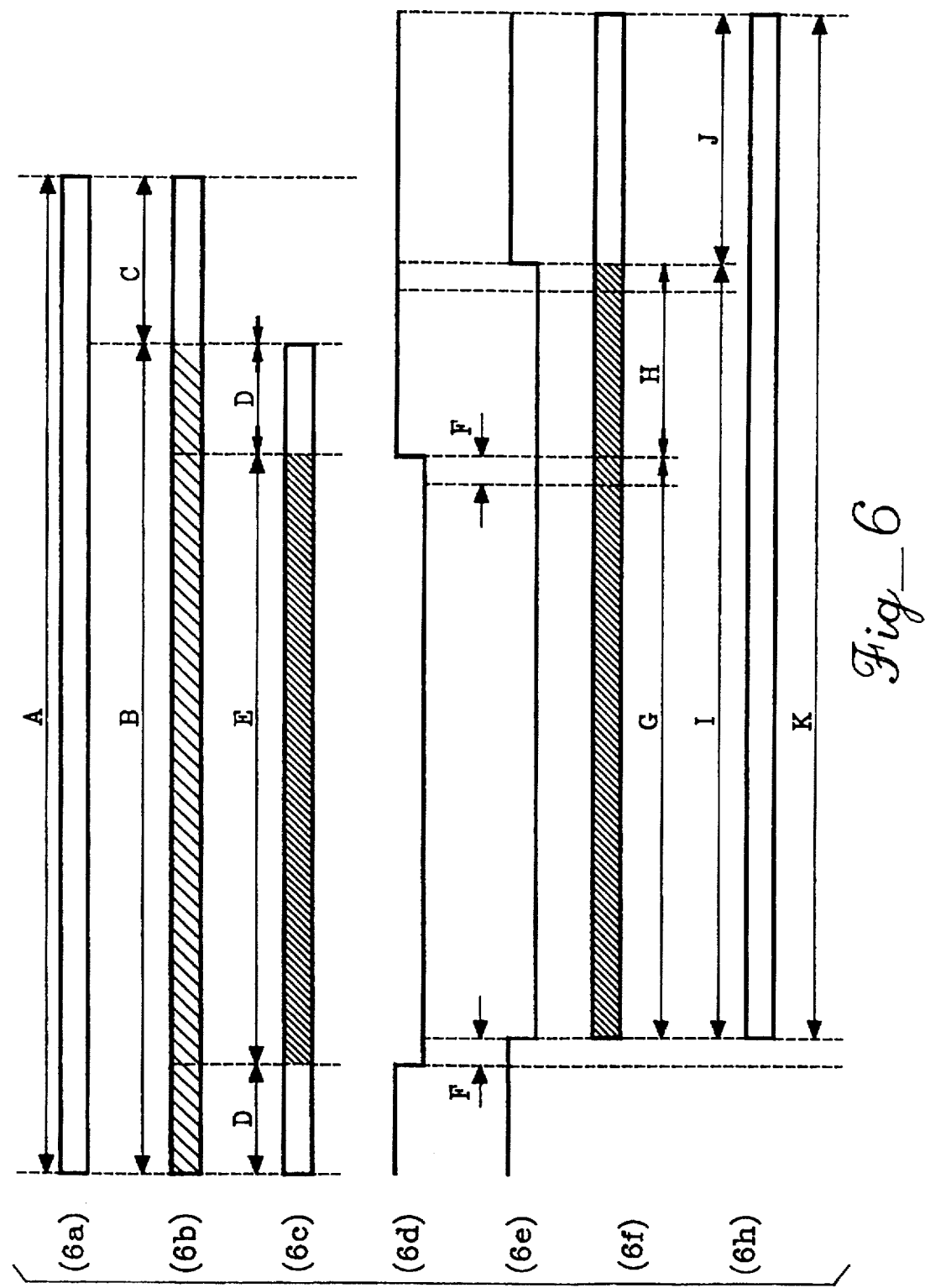
Fig_6

ASPECT RATIO CONVERTER AND METHOD THEREOF

BACKGROUND OF THE INVENTION

1. Field of the Invention

The present invention relates to an aspect ratio converter for converting a format of an input video signal into another format and outputting the same in a video signal processor, and method thereof, and more particularly, to an aspect ratio converter for converting a video signal format having an aspect ratio of 16:9 into one having an aspect ratio of 4:3.

The present application for an aspect ratio converter and method thereof, is based on Korean Application No. 13480/1996 which is incorporated herein by reference for all purposes.

2. Description of the Related Art

A high-definition television (HDTV) has a width-to-height ratio of 16:9 (to be referred to as an "aspect ratio"), which is wider than that of a conventional television having the aspect ratio of 4:3. Among picture modes of such HDTV, a full mode is a picture display mode for displaying a HDTV video signal whose picture of 16:9 is converted into one of 4:3 and is then written in a 16:9 picture. In such a manner, in order to convert a 16:9 picture into a 4:3 picture and record the same, an aspect ratio converter is necessary.

FIG. 1 illustrates a picture display state in case of converting the aspect ratio of 16:9 into that of 4:3. For example, in case of converting an aspect ratio 16:9 according to SMPTE 267M standards into 4:3 according to CCIR 601 and ANSI/SMPTE 125M standards, only the central portion corresponding to a 4:3 picture is selected from a horizontal line of a 16:9 picture and is written in a memory to then be read again. At this time, the clock of an input signal is 18 MHz and that of an output signal is 13.5 MHz. In other words, since the clock of the input signal is relatively fast and that of the output signal is slow, a time difference between a read operation and a write operation is generated. Thus, according to the conventional aspect ratio converter, read and write operations from/in two line memories are alternately repeated.

FIG. 2 is a schematic diagram of a conventional aspect ratio converter, which is disclosed in the National technical report Vol. 41, No. 2, April 1995 of Japan.

In FIG. 2, a first line memory 10 and a second line memory 20 have a memory size of 720 words, respectively. The first line memory 10 receives a first write enabling signal WC1 and a writing clock WCLK to record a video signal having an aspect ratio of 16:9 (16:9 VS), and receives a first read enabling signal RC1 and a reading clock RCLK to output a video signal having an aspect ratio of 4:3 (4:3 VS). In order to convert the video signal having an aspect ratio of 16:9 (16:9 VS) into the video signal having an aspect ratio of 4:3 (4:3 VS), only the central portion corresponding to a 4:3 picture is selected from a horizontal line of a 16:9 picture and is written in a memory to then be read and output. The second line memory 20 receives a second write enabling signal WC2 and the writing clock WCLK to record a video signal having an aspect ratio of 16:9 (16:9 VS), and receives a second read enabling signal RC2 and the reading clock RCLK to output a video signal having an aspect ratio of 4:3 (4:3 VS).

The clocks of the input signals of line memories 10 and 20 are both 18 MHz synchronized with the video signal having an aspect ratio of 16:9 (16:9 VS), and those of the output signals thereof are 13.5 MHz synchronized with the video signal having an aspect ratio of 4:3 (4:3 VS).

A line selector 30 includes a first port A connected to an output port of the first line memory 10 and a second port B connected to an output port of the second line memory 20, and is switched according to a line control signal LC. If the line selector 30 is switched to the first port A, the video signal having an aspect ratio of 4:3 (4:3 VS) is output from the first line memory 10. If the line selector 30 is switched to the second port B, the video signal having an aspect ratio of 16:9 (16:9 VS) is output from the second line memory 20. Thus, consecutive lines are output.

Waveforms 3a through 3f of FIG. 3 show a process of converting a 16:9 aspect ratio into a 4:3 aspect ratio in the aspect ratio converter shown in FIG. 2 and waveforms of a control signal therefor.

For the video signal having an aspect ratio of 16:9 (16:9 VS), shown as waveform 3a, data of a line unit is sequentially input for every one period of a horizontal synchronization (sync) signal, even-occurring lines and odd-occurring lines being alternately input and overall lines having a series of sequences. The respective odd-occurring lines are written in the first line memory 10 by the first write enabling signal WC1, shown as waveform 3b, and the writing clock WCLK of 18 MHz whose waveform is not shown. The respective even-occurring lines are written in the second line memory 20 by the second write enabling signal WC2, shown as waveform 3c, and the writing clock WCLK.

The video signal having an aspect ratio of 16:9 (16:9 VS) of the thus-input even-occurring lines or odd-occurring lines is read by the first read enabling signal RC1, shown as waveform 3d, and the reading clock RCLK (not shown) or by the second read enabling signal RC2 and the reading clock RCLK, to then output the video signal having an aspect ratio of 4:3 (4:3 VS).

In other words, during a low active period of the first write enabling signal WC1, the 4:3 portion of a first line is written in the first line memory 10. During a low active period of the second write enabling signal WC2, the 4:3 portion of a second line is written in second first line memory 20. While the 4:3 portion of the second line is written in the second line memory 20, the first line is read from the first line memory 10 during the low active period of the first read enabling signal RC1. Also, while the 4:3 portion of a third line is written in the first line memory 10 during the low active period of the first write enabling signal WC1, the second line is read from the second line memory 20 during the low active period of the second write enabling signal RC2.

In such a manner, if two line memories are used, the hardware becomes considerably bulky. In other words, a required memory size for the signal-processing of 10 bits for each channel is calculated in the following equation (1) to obtain 43.2 Kbits, which is a very large capacity:

$$10 \times 3 \times 720 \times 2 = 43.2 \text{ Kbits} \quad (1)$$

where 10 denotes the number of signal-processed bits for each channel, 3 denotes the number of channels, 720 denotes a data size of effective periods of the video signal having an aspect ratio of 4:3 with respect to the video signal having an aspect ratio of 16:9, and 2 denotes the number of memories.

The increased memory size described above causes several problems such as cost increase, power consumption and deteriorated performance.

SUMMARY OF THE INVENTION

Therefore, it is an object of the present invention to provide an apparatus for converting an aspect ratio simply using a first-input-first-output (FIFO) memory.

It is another object of the present invention to provide an aspect ratio converter and method for converting a video signal format having an aspect ratio of 16:9 into one having an aspect ratio of 4:3 using a first-input-first output (FIFO) memory.

To accomplish the above objects, there is provided an aspect ratio converter for converting a first aspect ratio into a second aspect ratio, comprising: a controller for generating write and read enabling signals, a write clock signal of a first frequency and a read clock signal of a second frequency different from the first frequency; and a memory for writing video data synchronized with the first frequency in response to the write enabling signal and reading the written video data synchronized with the second frequency in response to the read enabling signal, wherein the memory has at least the capacity of storing pixel data corresponding to the difference between the first frequency and the second frequency.

BRIEF DESCRIPTION OF THE DRAWINGS

FIG. 1 illustrates a picture display state in case of converting a 16:9 picture into a 4:3 picture;

FIG. 2 is a schematic diagram of a conventional aspect ratio converter;

FIG. 4 is a schematic diagram of an aspect ratio converter according to the present invention;

FIG. 5 shows waveforms 5a through 5d for a process of converting a 16:9 aspect ratio into a 4:3 aspect ratio in the aspect ratio converter shown in FIG. 4 and waveforms of a control signal therefor; and FIG. 6 is a detailed waveform timing diagram of the waveforms shown in FIG. 5.

DETAILED DESCRIPTION OF THE PREFERRED EMBODIMENT

Figure 3:
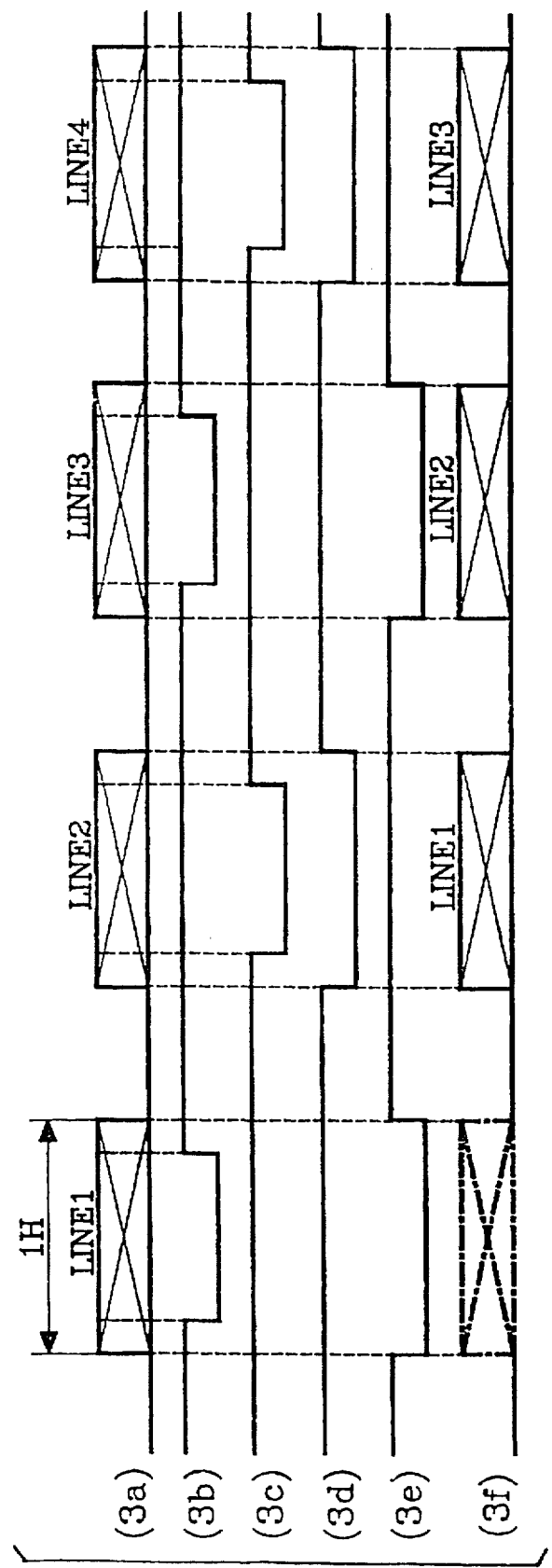
FIG. 3 shows waveforms 3a through 3f for a process of converting a 16:9 aspect ratio into a 4:3 aspect ratio in the aspect ratio converter shown in FIG. 2 and waveforms of a control signal therefor.

Hereinbelow, a preferred embodiment of the present invention will be described in detail with reference to accompanying drawings.

First, it should be noted that the same components are designated by the same reference numerals throughout the specification. Also, in the following explanation, many specific items such as components of a detailed circuit are given for better understanding of the present invention. However, it will be apparent to those having the ordinary skill in the art that the present invention can be embodied without these specific items. Also, the detailed explanation for well-known functions and components which may obscure the gist of the present invention will be omitted herein.

FIG. 4 is a schematic diagram of an aspect ratio converter according to the present invention, which includes a FIFO memory 40 using a read enabling signal $\overline{RE}$, a write enabling signal $\overline{WE}$, a reading clock RCLK, and a writing clock WCLK.

The case of converting an aspect ratio 16:9 according to SMPTE 267M standards into 4:3 according to CCIR 601 and ANSI/SMPTE 125M standards, will be explained, as an example. Typical variables of the SMPTE 267M and ANSI/SMPTE 125M necessary for converting the aspect ratio from 16:9 into 4:3 are indicated in the following Table 1.

TABLE 1

| | Specification | |
|---|---|---|
| | SMPTE 267M | SMPTE 125M |
| Aspect ratio | 16:9 | 4:3 |
| Clock period | 18 MHz | 13.5 MHz |
| Total samples | 1144 | 858 |
| Effective samples | 960 | 720 |

The FIFO memory 40 receives the write enabling signal $\overline{WE}$ and writing clock WCLK from a unit (not shown, but referred to as a controller) for generating a control signal and supplying clocks and stores the video signal having an aspect ratio of 16:9 (16:9 VS). Thereafter, if the read enabling signal $\overline{RE}$ and reading clock RCLK are applied from the controller, the video signal having an aspect ratio of 16:9 (16:9 VS) is converted into the video signal having an aspect ratio of 4:3 (4:3 VS) to then be output.

FIG. 5 is a timing diagram of waveforms 5a-5b which schematically shows a process of converting a 16:9 aspect ratio into a 4:3 aspect ratio in the aspect ratio converter shown in FIG. 4 and waveforms of a control signal therefor.

Waveform 5a illustrates a video signal having an aspect ratio of 16:9 (16:9 VS). Waveform 5b illustrates a write enabling signal $\overline{WE}$, in which among the video signals having the aspect ratio of 16:9 (shown in waveform 5a), only the central portion corresponding to the aspect ratio 4:3 is written in the FIFO memory 40 by the writing clock WCLK (not shown) during the low active period of the write enabling signal $\overline{WE}$. Waveform 5c illustrates a read enabling signal $\overline{RE}$, in which a video signal having the aspect ratio 4:3 (4:3 VS) shown in waveform 5d is output from the FIFO memory 40 by the reading clock RCLK during the low active period of the read enabling signal $\overline{RE}$.

Waveforms 6a through 6h, shown in FIG. 6, are detailed waveform diagrams of the waveforms shown in FIG. 5.

During a section 'A' shown in waveform 6a, the clock of an input signal is 18 MHz, the number of total samples consisting of one line is 1144, and the time necessary for this period is 63.5 μs. Waveform 6b shows a section 'B' which is an active period from the the section 'A', which consists of 960 samples (53.3 μs). A section 'C' is a synchronized period, in which the number of total samples are 180 and the necessary time is 12.2 μs. Waveform 6c shows how 960 samples of the section 'B' for the video signal having the aspect ratio of 16:9 (16:9 VS) are divided on conversion into the aspect ratio of 4:3. In other words, if the aspect ratio is converted into 4:3, since 720 samples (Corresponding to a section 'E') are obtained from the central portion of 960 sample section (i.e., the section 'B'), the division is made by each 120 samples (section 'D') before and after the 720 sample section.

Waveform diagram 6d is a write enabling signal $\overline{WE}$. The write enabling signal $\overline{WE}$ is made to be a low state after 120 samples from an effective (active) sample among 960 sample of the section 'A' and then starts to be stored in the FIFO memory 40. At this time, the clock period of the stored data is 18 MHz. After storing 720 samples in such a manner, the write enabling signal $\overline{WE}$ is made to be a high state again.

Waveform diagram 6e is a read enabling signal $\overline{RE}$. After a section 'F' since the storage is started, the read enabling signal $\overline{RE}$ becomes a low state and then starts to read the written video signal from the FIFO memory 40. At this time, the clock period of the read data is 13.5 MHz. The section 'F' corresponds to one clock of 13.5 MHz. In such a manner, if the section 'E' is read for 53.3 μs, only 540 sample are read out.

This is because of a time difference between the stored signal clock and the read clock, i.e., difference between 18 MHz and 13.5 MHz. Thus, even if the storage is completed for 40 μs, the read operation should be continuously performed for 13.5 μs, 53.3–40 (μs), to read the remaining 180 samples, thereby sufficing the proper effective samples, i.e., 720 samples for the aspect ratio of 4:3. Therefore, the data enough to read for 13.3 μs should be stored in the FIFO memory 40. In other words, only the memory capacity corresponding thereto (the capacity just enough to store 180 samples, in this case) is required. However, the required memory size may be increased or decreased by one or two depending on the memory characteristics and timing of the read/write enabling signals. Reference letter G denotes a section corresponding to 540 samples, H a section corresponding to 180 samples, I time necessary for reading effective 720 samples in the aspect ratio 4:3, i.e., 53.3 μs, and J time necessary for reading 138 pixel samples corresponding to a horizontal sync period in the aspect ratio 4:3, i.e., 12.2 μs. In other words, 12.2 μs is the horizontal sync period per one line for 13.5 MHz.

Waveform 6h shows that a video signal of the 4:3 aspect ratio is composed of 858 (720+138) samples in total. Reference letter K denotes a section in which 858 samples are read at a clock period of 13.5 MHz for 63.5 μs.

In conclusion, according to this embodiment of the present invention, the required memory size is calculated in the same manner as in the aforementioned conventional aspect ratio converter to be reduced to 5.4 Kbits as expressed in the following equation (2):

$$10 \times 3 \times 180 = 5.4 \text{ Kbits} \quad (2)$$

where 10 denotes the number of signal-processed bits per one channel, 3 the number of channels, and 180 the memory capacity necessary for time difference compensation.

Thus, the memory size can be reduced to ⅛ the conventional one, as expressed in the following equation (3):

$$43.2 \text{ Kbits}/5.4 \text{ Kbits} = 8 \quad (3)$$

As described above, according to the present invention, the power consumption can be reduced by converting an aspect ratio using a FIFO memory, compared to the conventional method using two line memories, and a miniaturized device and high-speed performance can be attained. Further, the number of control signals necessary for reading and writing data from/in the memory can be reduced. Also, the delay time of an input signal is reduced to less than one line.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An aspect ratio converting apparatus for converting video data from a first aspect ratio into a second aspect ratio, said apparatus comprising:

a controller for generating write and read enabling signals, a write clock signal of a first frequency and a read clock signal of a second frequency different from said first frequency; and a memory for writing the video data synchronized with said first frequency in response to said write enabling signal and reading said written video data synchronized with said second frequency in response to said read enabling signal, wherein the capacity for storing pixel data of said memory corresponds to the difference between said first frequency and said second frequency.

2. The apparatus as claimed in claim 1, wherein said first frequency is higher than said second frequency.

3. The apparatus as claimed in claim 1, wherein said first frequency is about 18 MHz and said second frequency is about 13.5 MHz.

4. An aspect ratio converting method for converting a first aspect ratio into a second aspect ratio, said method comprising the steps of:

writing video data into a FIFO memory in synchronization with a first frequency in response to a write enabling signal; and reading said written video data from said FIFO memory in synchronization with a second frequency different from said first frequency in response to a read enabling signal, wherein the storage capacity of said FIFO memory is sized to correspond to the difference between said first frequency and said second frequency.

5. An aspect ratio converting apparatus for converting video data from a first aspect ratio into a second aspect ratio, said apparatus comprising:

a controller for generating write and read enabling signals, a write clock signal of a first frequency and a read clock signal of a second frequency, said second frequency being different from said first frequency; and a memory for writing video data synchronized with said first frequency in response to said write enabling signal and reading said written video data synchronized with said second frequency in response to said read enabling signal, wherein the capacity for storing pixel data of said memory corresponds to the difference between a period of said first frequency and a period of said second frequency.

6. The apparatus as claimed in claim 5, wherein said capacity of said memory for storing pixel data is substantially proportional to the difference between a period of said first frequency and a period of said second frequency.

7. The apparatus as claimed in claim 5, wherein said memory is a FIFO memory.

8. The apparatus as claimed in claim 1, wherein said memory is a FIFO memory.

* * * * *